US011222102B2

(12) United States Patent
Kruczek et al.

(10) Patent No.: US 11,222,102 B2
(45) Date of Patent: Jan. 11, 2022

(54) ANONYMIZED BIOMETRIC DATA INTEGRATION

(71) Applicant: NCR Corporation, Atlanta, GA (US)

(72) Inventors: Tomasz Kruczek, Fremont, CA (US); Tim Gerlach, Atlanta, GA (US); Lucas Henrique Silva, Mountain View, CA (US); Bruce McBain, Pleasanton, CA (US); Garrett Paul Schubiner, Burlingame, CA (US)

(73) Assignee: NCR Corporation, Atlanta, GA (US)

( * ) Notice: Subject to any disclaimer, the term of this patent is extended or adjusted under 35 U.S.C. 154(b) by 104 days.

(21) Appl. No.: 16/697,751

(22) Filed: Nov. 27, 2019

(65) Prior Publication Data

US 2021/0157885 A1 May 27, 2021

(51) Int. Cl.
*G06F 21/32* (2013.01)
*G06Q 20/40* (2012.01)
*G07F 7/10* (2006.01)
*G06Q 20/34* (2012.01)
*G07C 9/37* (2020.01)
*G07C 9/25* (2020.01)
*G07C 9/26* (2020.01)

(52) U.S. Cl.
CPC ........... *G06F 21/32* (2013.01); *G06Q 20/341* (2013.01); *G06Q 20/40145* (2013.01); *G07C 9/257* (2020.01); *G07C 9/37* (2020.01); *G07F 7/1008* (2013.01); *G07C 9/26* (2020.01)

(58) Field of Classification Search
CPC .................................. G06F 21/32; G07C 9/37
USPC ....................................................... 713/186
See application file for complete search history.

(56) References Cited

U.S. PATENT DOCUMENTS

| 9,418,214 | B1* | 8/2016 | Harding | G06F 21/6254 |
| 2012/0005732 | A1* | 1/2012 | Shinzaki | G06F 21/32 726/6 |
| 2015/0135259 | A1* | 5/2015 | Ilyadis | H04L 63/0281 726/1 |
| 2015/0242607 | A1* | 8/2015 | Morris | H04L 63/0407 713/186 |
| 2017/0302661 | A1* | 10/2017 | Connell, II | H04L 63/0861 |

(Continued)

OTHER PUBLICATIONS

IP.com search attached.*

*Primary Examiner* — Allyson N Trail
(74) *Attorney, Agent, or Firm* — Schwegman, Lundberg & Woessner

(57) ABSTRACT

Biometric features are derived from security data associated with a subject. The security data is obtained from a security device. A biometric value is calculated from the biometric features. The biometric value is anonymized to an identifier associated with the subject. The identifier is integrated with event data associated with a security system. In an embodiment, the security device is a Personal Identification Number (PIN) pad integrated into a transaction terminal, the security data is fingerprint data, which is read from a finger of the subject placed on a fingerprint reader integrated into the PIN pad, and the biometric value is a PIN calculated from fingerprint data during a transaction at the transaction terminal. In an embodiment, the security device is a security camera, the security data is a secure video stream, and the biometric features are facial features of the subject in the secure video stream.

18 Claims, 4 Drawing Sheets

(56) References Cited

U.S. PATENT DOCUMENTS

2019/0206174 A1* 7/2019 Miu ................. G06Q 20/40145
2020/0042681 A1* 2/2020 Benkreira ................. A61B 5/08
2021/0110357 A1* 4/2021 Wisniewski ........... G06Q 20/02

* cited by examiner

ANONYMIZED BIOMETRIC DATA INTEGRATION

BACKGROUND

Increasingly, information about consumers is being collected and stored on servers by companies. The types and volumes of information being collected are alarming to consumer advocates. External servers now contain personal details of consumers (such as address, birthdates, phone numbers, marital status, names of children/spouse, etc.). However, some information that is being collected the average consumer is generally unaware of, such as: spending details/history, physical locations of the consumer on any given day and at any given time of the day, medical history, amount of time spent on a phone, amount of time spent on mobile applications, and even private voice conversations of consumers while at home, which has recently been reported as being picked up by network-based voice assistants and actively listened to by some companies.

It is unsurprising in the current climate that consumers are reluctant to provide any biometric data to companies. No server is 100% secure and nearly every week a major headline is that some company's consumer database was compromised by a hacker. A hacker armed with a consumer's biometric data could wreak havoc on that consumer's life. Because of this consumer reluctance and because of government regulations and laws with respect to procedures for the handing of private data of consumers, many companies are also reluctant to deploy biometric authentication solutions for authenticating their customers. Companies do not want to retain or be responsible for retaining biometric data of their customers even when such data provides superior security to consumer-based assets managed by the companies.

Accordingly, there is a need in the industry to provide mechanism by which biometric data of a consumer does not require storage by companies while such data may still be used for security-based solutions. There is also a need to utilize biometric data for security solutions without exposing the true identities of the consumers.

SUMMARY in various embodiments, methods and a system for anonymized biometric data integration are provided.

According to an aspect, a method for anonymized biometric data integration is presented. Biometric features of a subject are obtained from a security device. A biometric value is calculated from the biometric features. The biometric value is anonymized as an identifier associated with the subject and the identifier is integrated with event data of a security system.

According to another aspect, another method for anonymized biometric data integration is presented. Source data captured by a security device is received. Biometric data for a subject is derived from the source data. The biometric data is anonymized to an identifier associated with the subject and the identifier is provided to a security system.

In still another aspect, a system for anonymized biometric data integration is presented. The system includes a security device, a processor, and non-transitory computer-readable storage medium comprising executable instruction. The executable instructions when executed by the processor from the non-transitory computer-readable storage medium cause the processor to performing processing comprising: 1) receiving source data from the security device; 2) deriving biometric features for a subject associated with the source data; 3) calculating a biometric value from the biometric features; 4) anonymizing the biometric value to an identifier associated with the subject; and 5) providing the identifier to a security system.

DETAILED DESCRIPTION

Figure 1:
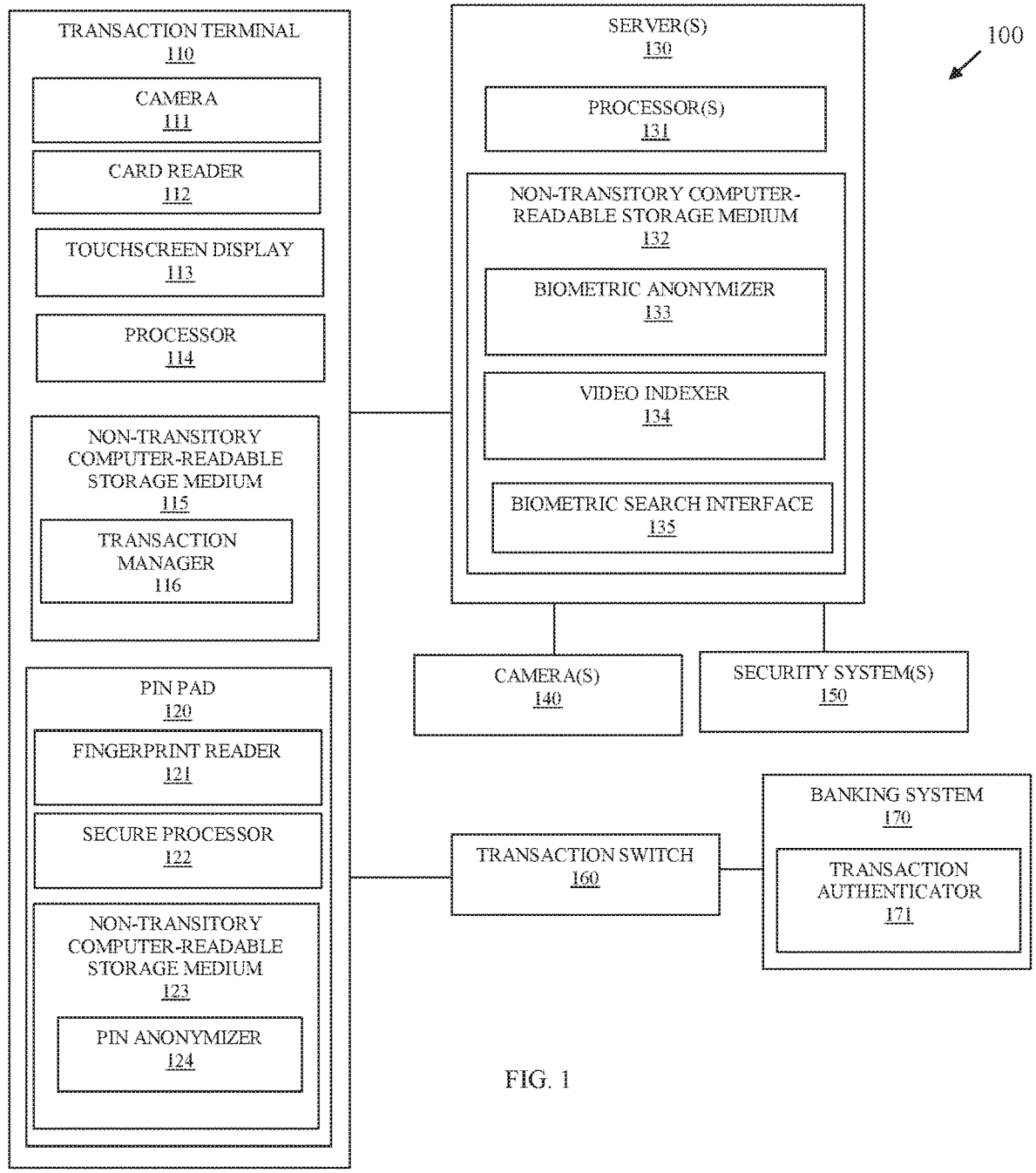
FIG. 1 is a diagram of a system for anonymized biometric data integration, according to an example embodiment.

FIG. 1 is a diagram of a system 100 for anonymized biometric data integration, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of anonymized biometric data integration, presented herein and below.

As used herein and below, the terms "user," "consumer," "user," "subject," and "customer" may be used interchangeably and synonymously. The terms refer to an individual for which biometric features are captured from security data provided from a security device.

System 100 includes a transaction terminal 110, a Personal Identification Number (PIN) pad 120, one or more servers 130, cameras 140, security systems 150, a transaction switch 160, and a banking system 170.

The transaction terminal 110 includes a camera 111, a card reader 112, a touchscreen display 113, a processor 114, a non-transitory computer-readable storage medium 115 having executable instructions representing a transaction manager, and an integrated peripheral device (PIN pad 120). The PIN pad 120 includes a fingerprint reader 121, a secure processor 122, a non-transitory computer-readable storage medium 123 having executable instructions representing a PIN anonymizer 124.

Transaction manager 116 when executed by processor 114 from non-transitory computer-readable storage medium 115 processes transactions being performed on transaction terminal 110. During any given transaction, a user/operator may supply a card, which is read by card reader 112 and transaction manager 116 requests processor 114 pass control to secure processor 122. PIN anonymizer 124 is then executed by secure processor 122 from non-transitory computer-readable storage medium 123 causes processor 122 to: identify banking system 170 from card data read by card reader 112, match a PIN length that is expected by banking system 170, activate fingerprint reader 121, obtain fingerprint data from a finger of the user placed on fingerprint reader 121, calculate/hash biometric data from features of the fingerprint data to a PIN length expected by banking system 170 (the biometric data representing the PIN registered to the user with the banking system for the user's account and card), hash the biometric data of the PIN length to a hash value (this hash may also include a transaction identifier for the transaction), and supply the hash value back to processor 114 and transaction manager 116. At no time is the biometric features stored within the PIN pad 120. Moreover, the biometric data is anonymized because a hash value is calculated that is different from the biometric data and is of the PIN length expected by the banking system associated with the card data of the card.

Transaction manager 116 passes the card data and the transaction-specific hash value to transaction switch 160. Transaction switch 160 identifies banking system 170 from the card data and passes the card data and hash value to banking system 170. Transaction authenticator 171 compares hash value to a stored hash value for the user associated with the card data and assuming there is a match, the PIN supplied by the user through the fingerprint is authenticated for the transaction. Banking system 170 responds back through transaction switch 160 with a transaction authentication code. Transaction manager 116 then perm its the user transaction to proceed at transaction terminal for purposes of any number of transactions, such as a purchase, a cash withdrawal, a deposit, a balance inquiry of an account, etc.

In the above-noted situation, the user has previously established a PIN with banking system 170. A same hashing function used by PIN anonymizer 124 is used by transaction authenticator 171. The user provides a fingerprint scan to banking system 170, transaction authenticator 171 performs a hash and stores the resulting hash value as a PIN of a configured digit length for the user associated with the user account identified by the card data of the user's card. The actual fingerprint data of the user is not stored or retained by banking system 170.

In an embodiment, the PIN anonymizer 124 may also encrypt the transaction hash value, such that transaction manager 116 and transaction switch only see an encrypted hash value, which neither are able to decrypt. Transaction authenticator 171 includes appropriate decryption keys to decrypt the encrypted and transaction-specific hash value and compare the decrypted hash value against a registered hash value for the user, the registered hash value representing a hash of a user PIN in the configured digit length.

It is noted that PIN anonymizer 124 calculates biometric data to a length of digits that is expected for PINs recognized by banking system 170. Card details allow PIN anonymizer 124 to match the banking system 170 to a required length for any PIN processed by any banking system 170.

It is also noted, that PIN anonymizer 124 uses specific biometric features of the fingerprint data and a specific scoring or calculation to generate a user PIN of the configured digit length. For example, the biometric features may include: a total number of observed lines from a center point or reference point of the fingerprint data, a distance between two specific fingerprint lines, an arch length of a specific fingerprint line, etc. Transaction authenticator 171 uses the same biometric features and the same calculations to register the user's fingerprint data as PIN anonymizer 124 for a registered PIN of the user having the configured digit length and transaction authenticator 171 uses the same score algorithm as PIN anonymizer 124 to generate the PIN or a hash representing the PIN. In this way, there is consistency between a registered fingerprint that was registered as a PIN by a user with banking system 170 and what is generated and supplied as the PIN by PIN anonymizer 124.

In an embodiment, transaction terminal 110 is: an Automated Teller Machine (ATM), a Self-Service Terminal (SST), a Point-Of-Sale (POS) terminal, or a kiosk.

In an embodiment, PIN pad 120 is an encrypted PIN pad meaning that any provided hash value is further encrypted, and the encryption may depend on a transaction identifier for the transaction, such that the encryption of the hash value is specific to the transaction being conducted at transaction terminal 110.

The above-presented processing for transaction terminal 110 is one embodiment of anonymized biometric data integration scenario presented herein. Server 130 provides another scenario that is not based on a specific transaction being conducted although could be relevant to a transaction being conducted at transaction terminal 110 by a user.

Server 130 includes one or more processors 131, a non-transitory computer-readable storage medium 132 having executable instructions representing a biometric anonymizer 133, a video indexer 134, and a biometric search interface 135.

Cameras 140 capture video or defined areas of an enterprise. The cameras represent a security device that capture security video for the enterprise. The video is provided to server 130. Biometric anonymizer 133 performs video or image analysis on frames of the video looking for faces of subjects (individuals) depicted in the video. A facial template that provides pixel attributes of faces may be used by anonymizer 133 to identify faces in the frames of the video. One anonymizer 133 recognizes a face, pixel attributes of the recognized face are sampled to obtain a facial print for a specific subject associated with the face. The facial print representing biometric data or biometric features for the subject. The facial print representing the biometric data is then calculated into a biometric value. The biometric value is then anonymized by assigning it to a randomly generated identifier. Anonymizer 133 maintains a mapping between the biometric value and the randomly assigned identifier. Anonymizer 133 performs this processing on frames of the video for each unique individual noted in the video; that is, each unique subject or individual has his/her own uniquely identifiable randomly assigned identifier.

Once a randomly assigned identifier is assigned to a frame of the video, the corresponding frame (including metadata such as: location of camera 140, time of day, day of week, frame # within the video, etc.) and randomly assigned identifier are passed from anonymizer 133 to video indexer 134. Video indexer 134 maintains a searchable index that is separate from the video that links or maps the randomly assigned identifier to the metadata for the video including the frame number, which represents a location within the video where the randomly assigned identifier can be found. In an embodiment, the index of the video may be carried as metadata with the video, such that the index is not separate from the video.

Biometric search interface 135 permits searches to be conducted based on a variety of search factors, such as time of day, calendar day, randomly assigned identifier, and/or an image of a candidate face, which may be clipped or identified from a video frame to search interface 135. So, a video frame having a face of a subject may be provided as a search term or search criteria to interface 135. Interface 135 provides the frame having the face to anonymizer 133. Anonymizer 133 derives biometric data or facial features from the face in the image, calculates a biometric value, and matches the biometric value to a previously generated randomly assigned identifier of a subject (or generates a candidate identifier for the biometric value (assuming generation of the randomly generated identifiers are consistently assigned a unique identifier based on the biometric value). Anonymizer 133 provides the randomly assigned identifier to search interface 135, and search interface 135 searches the index produced and maintained by video indexer 134 and receives back video frames of multiple video streams where the randomly assigned identifier can be found. Search interface 135 then uses the video identifiers and frame identifiers to retrieve video clips having the face of the subject and provides the video clips as search results.

Search interface 135 can take multiple different search constraints for a given search request, such as camera location, time of day, calendar day, and a candidate facial image. Moreover, the constraints may be provided in Boolean statements using AND, OR, NOT or various combinations. Search results may be refined as well, such that the results can be filtered by subsequent search constraints provided by the user.

As one example, consider a theft at an enterprise that was recurring on a given day of the week. Search interface 135 may be used to obtain video clips for that given day of the week and employee photographs provided as additional search terms/constraints. The results may show a given employee associated or present at the time of each of the thefts and may lead to a more focused investigation of the video streams to determined is such employee was involved.

In an embodiment, security systems 150 may generate events for security situations within the enterprise, such as thefts, unauthorized access to secure areas or resources. When the events are raised, video captured by cameras 140 are passed by security systems 150 to anonymizer 133 and faces of subjects are assigned randomly assigned identifiers and indexed to the video, which correlates to the security events or event data.

In an embodiment, historical security video may be run in batch through anonymizer 133 and indexer 134 to create a comprehensive video index available for searching by the enterprise through search interface 135.

Again, at no point does anonymizer 133 ever store facial biometric data of the subjects; rather calculated biometric values are maintained without any association to a particular user identity. The biometric values are linked to randomly assigned identifiers or any given biometric value is consistently assigned a specific randomly assigned identifier, such that linking is unnecessary.

In an embodiment, biometric anonymizer 133 can perform similar anonymizing biometric data integration on voice of subjects captured by microphones situated through the enterprise. In such cases, the biometric features are a voice print that is calculated to a value and then linked to a randomly assigned identifier or any given calculated value is consistently assigned to a unique randomly assigned identifier.

In an embodiment, biometric anonymizer 133 can perform similar anonymizing biometric data integration on iris data for eyes, extremity features, gait of subject walking, etc.

In an embodiment, system 100 performs anonymization of a plurality of different biometric data captured by face images, fingerprint images, voice, eyes, extremity features, and/or gaits of subjects, indexes the anonymized biometric data to source data and/or security events, and provides a search interface and/or notifications services to a plurality of security systems 150.

These and other embodiments are now discussed with reference to the FIGS. 2-4.

Figure 2:
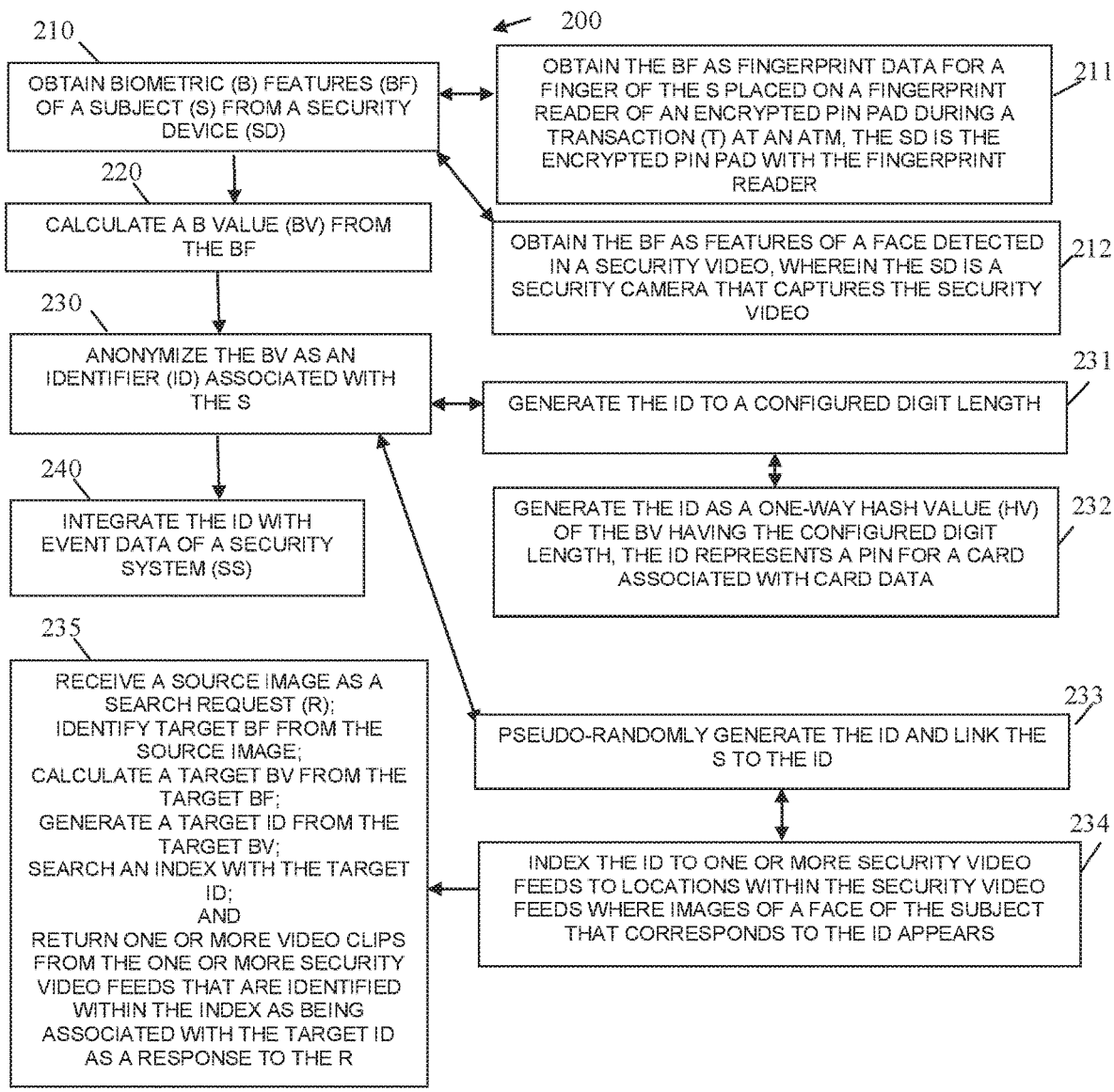
FIG. 2 is a diagram of a method for anonymized biometric data integration, according to an example embodiment.

FIG. 2 is a diagram of a method 200 for anonymized biometric data integration, according to an example embodiment. The software module(s) that implements the method 200 is referred to as a "biometric anonymizer." The biometric anonymizer is implemented as executable instructions programmed and residing within memory and/or a non-transitory computer-readable (processor-readable) storage medium and executed by one or more processors of a device. The processor(s) of the device that executes the biometric anonymizer are specifically configured and programmed to process the biometric anonymizer. The biometric anonymizer may have access to one or more network connections during its processing. The network connections can be wired, wireless, or a combination of wired and wireless.

In an embodiment, the device that executes the biometric anonymizer is PIN pad 120. In this embodiment, the biometric anonymizer is the PIN anonymizer 124. In an embodiment, the PIN pad 120 is an encrypted PIN pad integrated into transaction terminal 110. Pin anonymizer 124 supplies a hash value for a PIN during a transaction to transaction manager 116; transaction manager 116 forwards the hash value to a transaction authenticator for validating the PIN of the user during a transaction based on card details read by card reader 112. The PIN pad 120 further includes an integrated fingerprint reader 121, which captures biometric features of the user's finger as the user-supplied PIN for using a card and performing a transaction at transaction terminal 110. In an embodiment, transaction terminal 110 is: an ATM, an SST, a kiosk, or a POS terminal.

In an embodiment, the device that executes the biometric anonymizer is server 130. In this embodiment, the biometric anonymizer is biometric anonymizer 133, video indexer 134, and/or biometric search interface 135.

At 210, the biometric anonymizer obtains biometric features of a subject from a security device.

In an embodiment, at 211, the biometric anonymizer obtains the biometric features as fingerprint data for a finger of the subject placed on fingerprint reader 121 of an encrypted PIN pad 120 during a transaction at an ATM 110. The security device is the encrypted PIN pad 120 with the fingerprint reader 121 integrated therein.

In an embodiment, at 212, the biometric anonymizer obtains the biometric features as a face detected in a security video. The security device is a secure camera 140 that captures and provides the security video.

At 220, the biometric anonymizer calculates a biometric value from the biometric features. That is, the features are weighted and scored to produce a biometric value representing the features.

At 230, the biometric anonymizer anonymizes the biometric value as an identifier associated with the subject.

In an embodiment, at 231, the biometric anonymizer generates the identifier to a configured digit length. In an embodiment, the digit length is based on card data read by a card reader 112 during a transaction at a transaction terminal 110.

In an embodiment of 231 and at 232, the biometric anonymizer generates the identifier as a one-way hash value of the biometric value having the configured digit length. The identifier represents a PIN for a card associated with card data.

In an embodiment, at 233, the biometric anonymizer pseudo-randomly generates the identifier and links the subject to the pseudo-randomly generated identifier.

In an embodiment of 233 and at 234, the biometric anonymizer indexes the identifier to one or more security video feeds to locations within the security video feeds where images of a face of the subject that corresponds to the identifier appears.

In an embodiment of 234 and at 235, the biometric anonymizer receives a source image as a search request. The biometric anonymizer identifies target biometric features from a target face from the source image and calculates a target biometric value from the target biometric features. The biometric anonymizer generates a target identifier from the target biometric features and searches an index with the target identifier. The biometric anonymizer returns one or more video clips from the one or more security video feeds that are identified within the index as being associated with the target identifier as a response or results to the search request.

At 240, the biometric anonymizer integrates the identifier for event data of a security system. The event data may be transaction authentication for a transaction at a transaction terminal 110 or may be any event raised by a security system 150 generated by a sensor, an application, a monitor, and the like.

Figure 3:
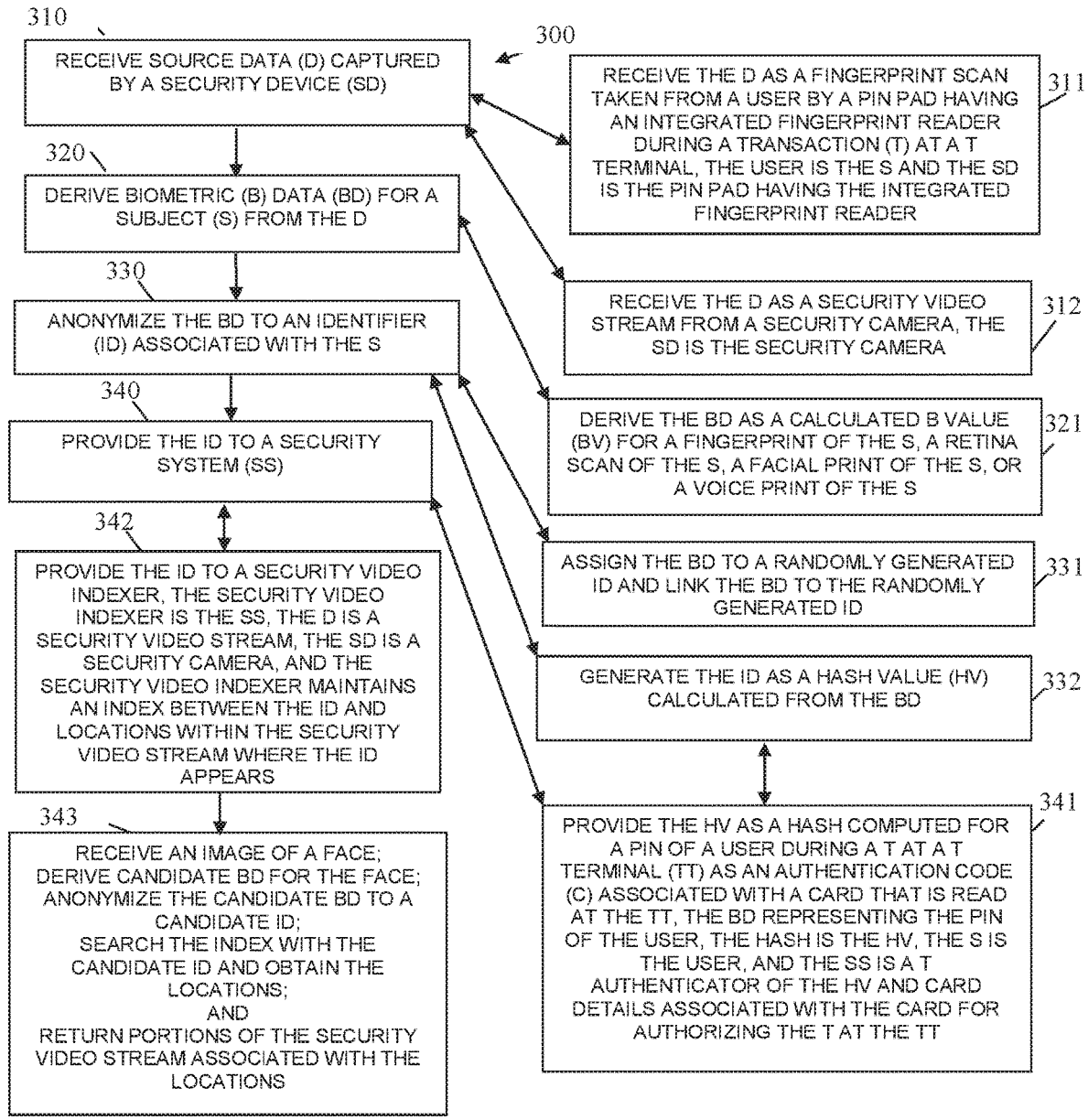
FIG. 3 is a diagram of another method for anonymized biometric data, according to an example embodiment.

FIG. 3 is a diagram of another method 300 for anonymized biometric data integration, according to an example embodiment. The software module(s) that implements the method 400 is referred to as a "biometric integrator." The biometric integrator is implemented as executable instructions programmed and residing within memory and/or a non-transitory computer-readable (processor-readable) storage medium and executed by one or more processors of a device. The processors that execute the transaction biometric integrator are specifically configured and programmed to process the biometric integrator. The biometric integrator may have access to one or more network connections during its processing. The network connections can be wired, wireless, or a combination of wired and wireless.

In an embodiment, the device that executes the biometric integrator is PIN pad 120. In this embodiment, the biometric integrator is the PIN anonymizer 124. In an embodiment, the PIN pad 120 is an encrypted PIN pad or a PIN pad integrated into transaction terminal 110. PIN anonymizer 124 supplies a one-way hash value for a PIN during a transaction to transaction manager 116; transaction manager 116 forwards the one-way hash value to a transaction authenticator for validating the PIN of the user during a transaction based on card details read by card reader 112. The PIN pad 120 further includes an integrated fingerprint reader 121, which captures biometric features of the user's finger and generates a PIN as a hash value from the biometric features as the user-supplied PIN for using a card and performing a transaction at transaction terminal 110. In an embodiment, transaction terminal 110 is: an ATM, an SST, a kiosk, or a POS terminal.

In an embodiment, the device that executes the biometric integrator is server 130. In this embodiment, the biometric anonymizer is biometric anonymizer 133, video indexer 134, and/or biometric search interface 135.

The biometric integrator presents another and, in some ways, enhanced processing perspective of method 200.

At 310, the biometric integrator receives source data captured by a security device.

In an embodiment, at 311, the biometric integrator receives the source data as a fingerprint scan taken from a user by a PIN pad 120 having an integrated fingerprint reader 121 during a transaction at a transaction terminal 110. The user is the subject and the security device is the encrypted PIN pad 120 having the integrated fingerprint reader 121.

In an embodiment, at 312, the biometric integrator receives the source data as a security video stream from a security camera. The security device is the security camera 140.

At 320, the biometric integrator derives biometric data for a subject from the source data.

In an embodiment, at 321, the biometric integrator derives the biometric data as a calculated biometric value for a fingerprint of the subject, a retina scan of the subject, a facial print of the subject, and/or a voice print of the subject.

At 330, the biometric integrator anonymizes the biometric data to an identifier associated with the subject.

In an embodiment, at 331, the biometric integrator assigns the biometric data to a randomly generated identifier and links the biometric data to the randomly generated identifier.

In an embodiment, at 332, the biometric integrator generates the identifier as a hash value calculated from the biometric data.

At 340, the biometric integrator provides the identifier to a security system.

In an embodiment of 332 and 340, at 341, the biometric integrator provides the hash value as a has computed for a PIN of a user during a transaction at a transaction terminal 110 as an authentication code associated with a card that is read at the transaction terminal 110. The biometric data represents the PIN of the user, the hash is the hash value, the subject is the user, and the security system is a transaction authenticator 171 of the hash value and card details associated with the card for authorizing the transaction at the transaction terminal 110.

In an embodiment, at 342, the biometric integrator provides the identifier to a security video indexer 134. Security video indexer 134 is the security system, the source data is a security video stream, the security device is a security camera 140, and the security video indexer 134 maintains an index between the identifier and locations within the security video stream where the identifier appears.

In an embodiment of 342 and at 343, the biometric integrator receives an image of a face, derives candidate biometric data for the face, anonymizes the candidate biometric data to a candidate identifier, searches the index with the candidate identifier, and returns portions of the security video stream associated with the locations; the locations were identified in the index when searching with the candidate identifier.

Figure 4:
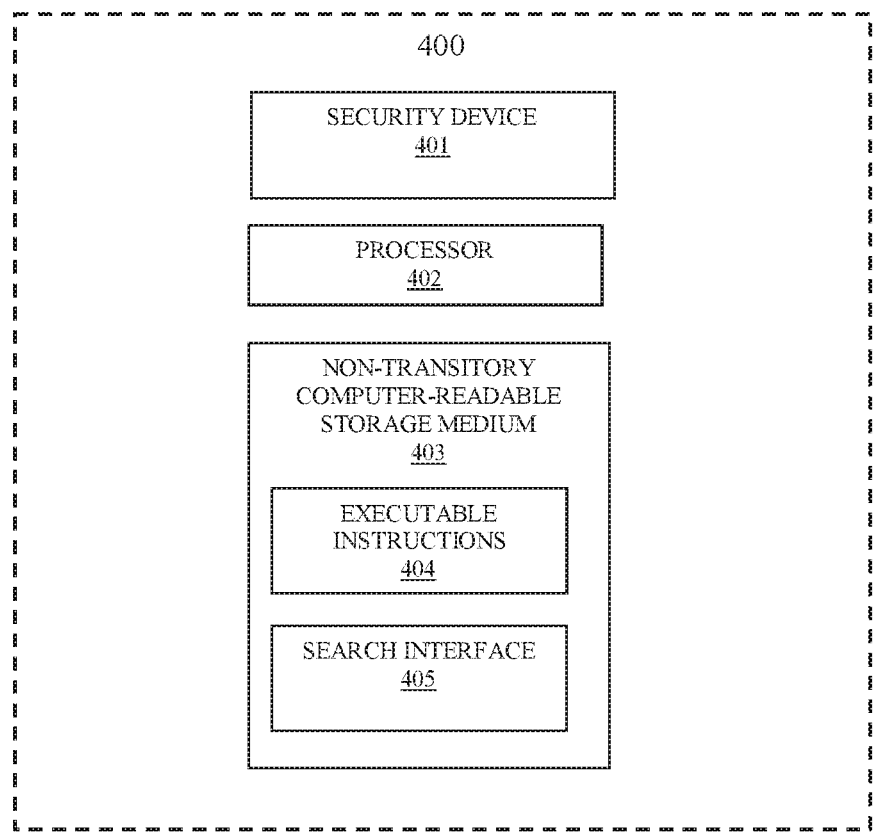
FIG. 4 is a diagram of another method for anonymized biometric data integration, according to an example embodiment.

FIG. 4 is a diagram of a system 400 for anonymized biometric data integration, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 performs the processing, inter alia, discussed above in FIGS. 1-3.

The system 400 includes: a security device 401, a processor 402, and a non-transitory computer-readable medium 403 comprising executable instructions 404, and optionally, a search interface 405.

In an embodiment, the security device 401 is PIN pad 120. In this embodiment, processor 402, non-transitory computer-readable storage medium 403, and executable instructions 404 reside within the PIN pad 120.

In an embodiment, the security device 401 is camera 140.

The executable instructions 404 when executed by the processor 402 from the non-transitory computer-readable storage medium 403 cause the processor 402 to: 1) receiving source data from the security device 401; 2) deriving biometric features for a subject associated with the source data;

3) calculating a biometric value from the biometric features; 4) anonymizing the biometric value to an identifier associated with the subject; and 5) providing the identifier to a security system.

In an embodiment, the security system is a transaction authenticator that authenticates a transaction at a transaction terminal based on an entered PIN supplied by the subject/user for a card. In this embodiment, the security device 401 is PIN pad 120 integrated into transaction terminal 110. PIN pad 120 includes a fingerprint reader 121 that reads a fingerprint of the user and receives the source data as fingerprint data, the biometric value represents a PIN for the user, and the identifier is a hash value representing a hash of the biometric value. The transaction terminal 110 is an ATM, an SST, a POS terminal, or a kiosk.

In an embodiment, the security system is a security indexer that generates an index that links the identifier representing an anonymized version of biometric features of a face for the user to locations within a video stream where the face of the subject is identified. The source data is the video stream having an image of a face of the subject, and the security device 401 is a security camera 140.

In an embodiment of the latter embodiment, the non-transitory computer-readable storage medium comprises additional executable instructions representing search interface 405. Search interface 405 when executed by processor 402 from non-transitory computer-readable storage medium 403 further causes the processor 402 to perform processing comprising: 1) receiving a candidate face image as a search request; 2) deriving candidate biometric features for the candidate face image; 3) calculating a candidate biometric value from the candidate biometric features; 4) anonymizing the candidate biometric value to a candidate identifier associated with a candidate subject; 5) searching the index with the candidate identifier and obtaining locations within the video stream indexed to the candidate identifier; and 7) returning portions of the video stream having the locations associated with the candidate identifier as results that satisfy the search request.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining biometric features of a subject from a security device, obtaining the biometric features as fingerprint data for a finger of the subject placed on a fingerprint reader of an encrypted Personal Identification Number (PIN) pad during a transaction at an Automated Teller Machine (ATM), wherein the security device is the encrypted PIN pad with the fingerprint reader;
calculating a biometric value from the biometric features;
anonymizing the biometric value as an identifier associated with the subject; and
integrating the identifier with event data of a security system.

2. A method, comprising:
obtaining biometric features of a subject from a security device, wherein obtaining further includes obtaining the biometric features as features of a face detected in a security video, wherein the security device is a security camera that captures the security video;
calculating a biometric value from the biometric features;
anonymizing the biometric value as an identifier associated with the subject; and
integrating the identifier with event data of a security system.

3. A method, comprising:
obtaining biometric features of a subject from a security device;
calculating a biometric value from the biometric features;
anonymizing the biometric value as an identifier associated with the subject, wherein anonymizing further includes generating the identifier to a configured digit length; and
integrating the identifier with event data of a security system.

4. The method of claim 3, wherein anonymizing further includes generating the identifier as a one-way hash value of the biometric value having the configured digit length, wherein the identifier represents a Personal Identification Number (PIN) for a card associated with the card data.

5. A method, comprising:
obtaining biometric features of a subject from a security device;
calculating a biometric value from the biometric features;
anonymizing the biometric value as an identifier associated with the subject, wherein anonymizing further includes pseudo-randomly generating the identifier and linking the subject to the identifier; and
integrating the identifier with event data of a security system.

6. The method of claim 5, wherein integrating further includes indexing the identifier to one or more security video feeds to locations within the security video feeds where images of a face of the subject that corresponds to the identifier appears.

7. The method of claim 6 further comprising:
receiving a source image as a search request;
identifying target biometric features of a target face from the source image;
calculating a target biometric value from the target biometric features;
generating a target identifier from the target biometric value;
searching an index with the target identifier; and
returning one or more video clips from the one or more security video feeds that are identified within the index as being associated with the target identifier as a response to the search request.

8. A method, comprising:
receiving source data captured by a security device;
deriving biometric data for a subject from the source data;

anonymizing the biometric data to an identifier associated with the subject, wherein anonymizing further includes generating the identifier as a hash value calculated from the biometric data; and providing the identifier to a security system.

9. The method of claim 8, wherein receiving further includes receiving the source data as a fingerprint scan taken from a user by a Personal Identification Number (PIN) pad having an integrated fingerprint reader during a transaction at a transaction terminal, wherein the user is the subject and the security device is the PIN pad having the integrated fingerprint reader.

10. The method of claim 8, wherein receiving further includes receiving the source data as a security video stream from a security camera, wherein the security device is the security camera.

11. The method of claim 8, wherein deriving further includes deriving the biometric data as a calculated biometric value for a fingerprint of the subject, a retina scan of the subject, a facial print of the subject, or a voice print of the subject.

12. The method of claim 8, wherein anonymizing further includes assigning the biometric data to a randomly generated identifier and linking the biometric data to the randomly generated identifier.

13. The method of claim 8, wherein providing further includes providing the hash value as a hash computed for a Personal Identification Number (PIN) for a user during a transaction at a transaction terminal as an authentication code associated with a card that is read at the transaction terminal, wherein the biometric data representing the PIN of the user, the hash is the hash value, the subject is the user, and the security system is a transaction authenticator of the hash value and card details associated with the card for authorizing the transaction.

14. The method of claim 8, wherein providing further includes providing the identifier to a security video indexer, wherein the security video indexer is the security system, the source data is a security video stream, and the security device is a security camera, wherein the security video indexer maintains an index between the identifier and locations within the security video stream where the identifier appears.

15. The method of claim 14 further comprising:
receiving an image of a face;
deriving candidate biometric data for the face;
anonymizing the candidate biometric data to a candidate identifier;
searching the index with the candidate identifier; and
returning portions of the security video stream associated with the locations based on the locations being linked to the candidate identifier in the index.

16. A system, comprising:
a security device;
a processor;
a non-transitory computer-readable storage medium having executable instructions; and
the executable instructions when executed by the processor from the non-transitory computer-readable storage medium cause the processor to perform operations comprising:
receiving source data from the security device;
deriving biometric features for a subject associated with the source data;
calculating a biometric value from the biometric features;
anonymizing the biometric value to an identifier associated with the subject; and
providing the identifier to a security system;
wherein the security device is an encrypted Personal Identification Number (PIN) pad integrated into a transaction terminal, and wherein the processor, the non-transitory computer-readable storage medium and the executable instructions reside within the encrypted PIN pad, and wherein the source data is a fingerprint scan of a fingerprint of the subject captured by a fingerprint scanner integrated within the encrypted PIN pad.

17. A system, comprising:
a security device;
a processor;
a non-transitory computer-readable storage medium having executable instructions; and
the executable instructions when executed by the processor from the non-transitory computer-readable storage medium cause the processor to perform operations comprising:
receiving source data from the security device;
deriving biometric features for a subject associated with the source data;
calculating a biometric value from the biometric features;
anonymizing the biometric value to an identifier associated with the subject; and
providing the identifier to a security system;
wherein the security device is a security camera, the source data is a video stream having an image of a face of the subject, and the security system is a security indexer that generates an index that links the identifier to locations within the video stream where the face of the subject was identified.

18. The system of claim 17 further comprising:
the non-transitory computer-readable storage medium further comprising additional executable instructions representing a search interface; and
the search interface when executed by the processor from the non-transitory computer-readable storage medium further causes the processor to perform operations comprising:
receiving a candidate face image as a search request;
deriving candidate biometric features for the candidate face image;
calculating a candidate biometric value from the candidate biometric features;
anonymizing the candidate biometric value to a candidate identifier associated with a candidate subject;
searching the index with the candidate identifier and obtaining the locations from the index; and
returning portions of the video stream having the locations associated with the candidate identifier as results that satisfy the search request.

* * * * *